United States Patent
Huang

(10) Patent No.: US 12,222,220 B2
(45) Date of Patent: Feb. 11, 2025

(54) FLOOR HEIGHT DETECTION METHOD AND RELATED SURVEILLANCE CAMERA

(71) Applicant: VIVOTEK INC., New Taipei (TW)

(72) Inventor: Chao-Tan Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 487 days.

(21) Appl. No.: 17/533,073

(22) Filed: Nov. 22, 2021

(65) Prior Publication Data

US 2022/0170740 A1    Jun. 2, 2022

(30) Foreign Application Priority Data

Nov. 27, 2020    (TW) .................................. 109141780

(51) Int. Cl.
| | | |
|---|---|---|
| *G06V 20/00* | (2022.01) | |
| *G01C 5/00* | (2006.01) | |
| *G06N 20/00* | (2019.01) | |
| *G06V 10/22* | (2022.01) | |
| *G06V 20/52* | (2022.01) | |

(52) U.S. Cl.
CPC ............... *G01C 5/00* (2013.01); *G06N 20/00* (2019.01); *G06V 10/22* (2022.01); *G06V 20/52* (2022.01)

(58) Field of Classification Search
CPC .......... G01C 5/00; G06N 20/00; G06V 10/22; G06V 20/52; G06V 20/10
See application file for complete search history.

(56) References Cited

U.S. PATENT DOCUMENTS

| | | | |
|---|---|---|---|
| 10,282,915 B1* | 5/2019 | Lin ..................... | G02B 27/01 |
| 2014/0293043 A1* | 10/2014 | Datta ..................... | G06T 7/60 |
| | | | 348/135 |
| 2016/0224837 A1* | 8/2016 | Lipert .................. | G06V 40/172 |
| 2019/0138818 A1* | 5/2019 | Gottumukkal ......... | G06T 7/194 |
| 2023/0136084 A1* | 5/2023 | Perrault .................. | G06T 7/97 |
| | | | 348/187 |
| 2024/0046497 A1* | 2/2024 | Huang .................. | G06V 10/761 |

FOREIGN PATENT DOCUMENTS

| | | |
|---|---|---|
| TW | M562465 U | 6/2018 |
| TW | 202008215 A | 2/2020 |
| TW | I705383 B | 9/2020 |

OTHER PUBLICATIONS

Liu, et al.: Surveillance Camera Autocalibration, Surveillance Camera Autocalibration based on Pedestrian Height Distributions (2011).*

* cited by examiner

*Primary Examiner* — Frank F Huang
(74) *Attorney, Agent, or Firm* — Winston Hsu

(57) ABSTRACT

A floor height detection method is applied to a surveillance camera, and a surveillance image captured by the surveillance camera contains a surveillance region. The floor height detection method includes dividing the surveillance image at least into a first region and a second region, acquiring an actual installing height matrix of the surveillance camera upon the first region and the second region, and utilizing a matrix factorization algorithm to analyze the actual installing height matrix to acquire floor heights within the surveillance region.

18 Claims, 4 Drawing Sheets

FLOOR HEIGHT DETECTION METHOD AND RELATED SURVEILLANCE CAMERA

BACKGROUND OF THE INVENTION

1. Field of the Invention

The present invention relates to a floor height detection method and a surveillance camera, and more particularly, to a floor height detection method capable of automatically detecting floor heights of the surveillance region without field measurement and a related surveillance camera.

2. Description of the Prior Art

A conventional surveillance camera is used to detect a moving object inside or outside the building, but a surveillance region of the surveillance camera may be an uneven surface which results in detected fault of the moving object. For example, the surveillance camera can face two floors of the building, or face one floor having a platform, or face a walkway surrounded by flower stands in the park. If a predefined installation height of the surveillance camera is defined as an interval between the surveillance camera and the walkway, one person who stands on the walkway can be detected by the surveillance camera to acquire an accurate body height, but the surveillance camera cannot acquire the accurate body height of another person standing on the flower stand (the detected height estimated by the surveillance camera is a sum of the body height and the flower stand's height). Thus, the conventional surveillance camera and the human detection method may misestimate floor height of the surveillance region and the body height of the human. Design of an image detection method capable of computing the accurate floor heights is an important issue in the surveillance industry.

SUMMARY OF THE INVENTION

The present invention provides a floor height detection method capable of automatically detecting floor heights of the surveillance region without field measurement and a related surveillance camera for solving above drawbacks.

According to the claimed invention, a floor height detection method is applied to a surveillance camera, and a surveillance image captured by the surveillance camera contains a surveillance region. The floor height detection method includes dividing the surveillance image at least into a first region and a second region, acquiring an installing height matrix of the surveillance camera upon the first region and the second region, and utilizing a matrix factorization algorithm to analyze the installing height matrix for acquiring floor heights of the surveillance region.

According to the claimed invention, a surveillance camera includes an image and an operation processor. The image receiver is adapted to receive a surveillance image containing a surveillance region. The operation processor is electrically connected to the image receiver in a wire manner or in a wireless manner, and adapted to analyze the surveillance image, so as to divide the surveillance image at least into a first region and a second region, acquire an installing height matrix of the surveillance camera upon the first region and the second region, and utilize a matrix factorization algorithm to analyze the installing height matrix for acquiring floor heights of the surveillance region.

The floor height detection method of the present invention can analyze height change of the calibration object to automatically detect and determine the installation height of the surveillance camera relative to the surveillance region, and then compute the floor heights of the surveillance region in accordance with the installation height changed in different regions of the surveillance region. As if the floor heights of the surveillance region are acquired, the surveillance camera can detect the target object within the surveillance region to execute accurate number and height analysis. The calibration object which is used to decide the floor heights is not limited to the human height as mentioned above, and any of a size of the vehicle, a feature size of the human (such as the face or the head) or a specific marker can be used to detect and decide the floor heights of the surveillance region. Comparing to the prior art, the surveillance camera and the floor height detection method of the present invention can analyze statistics data of the height change of the calibration object to determine the floor heights of the surveillance region, without executing field measurement, and have advantages of inexpensive cost and convenient operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
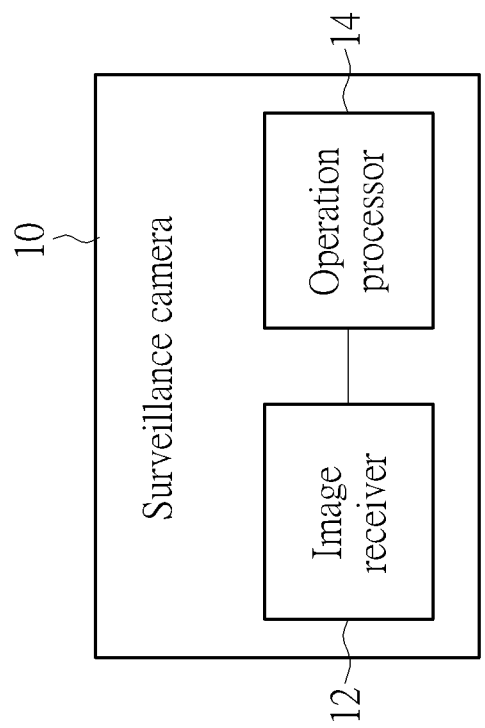
FIG. 1 is a functional block diagram of a surveillance camera according to an embodiment of the present invention.
Figure 2:
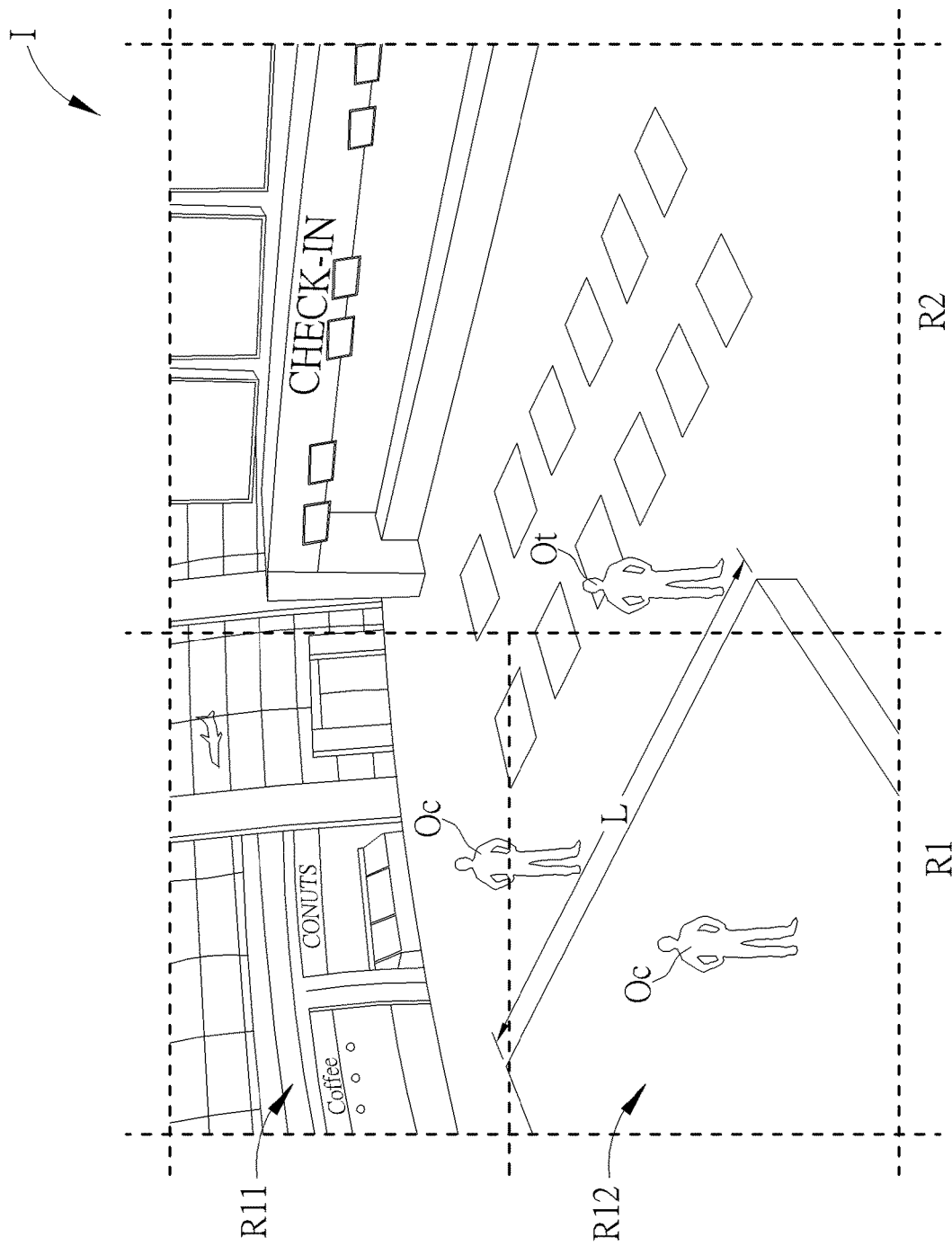
FIG. 2 is a diagram of a surveillance image acquired by the surveillance camera according to the embodiment of the present invention.

Please refer to FIG. 1 and FIG. 2. FIG. 1 is a functional block diagram of a surveillance camera 10 according to an embodiment of the present invention. FIG. 2 is a diagram of a surveillance image I acquired by the surveillance camera 10 according to the embodiment of the present invention. The surveillance camera 10 can be disposed inside or outside the building, and used to analyze and compute a number and a height of any moving object within a surveillance region of the surveillance camera 10. Inner space of the building may have floors or stairs, and outer space of the building may have hills or basins, so that the surveillance camera 10 can further analyze the surveillance image I to determine floor heights (which may represent topographic change of the floor or the ground) within the surveillance region. As shown in FIG. 2, the surveillance camera 10 can be disposed inside the airport, and the surveillance region may be one floor of the airport. The said floor may have a platform inside to occupy a left side of the said floor.

Figure 3:
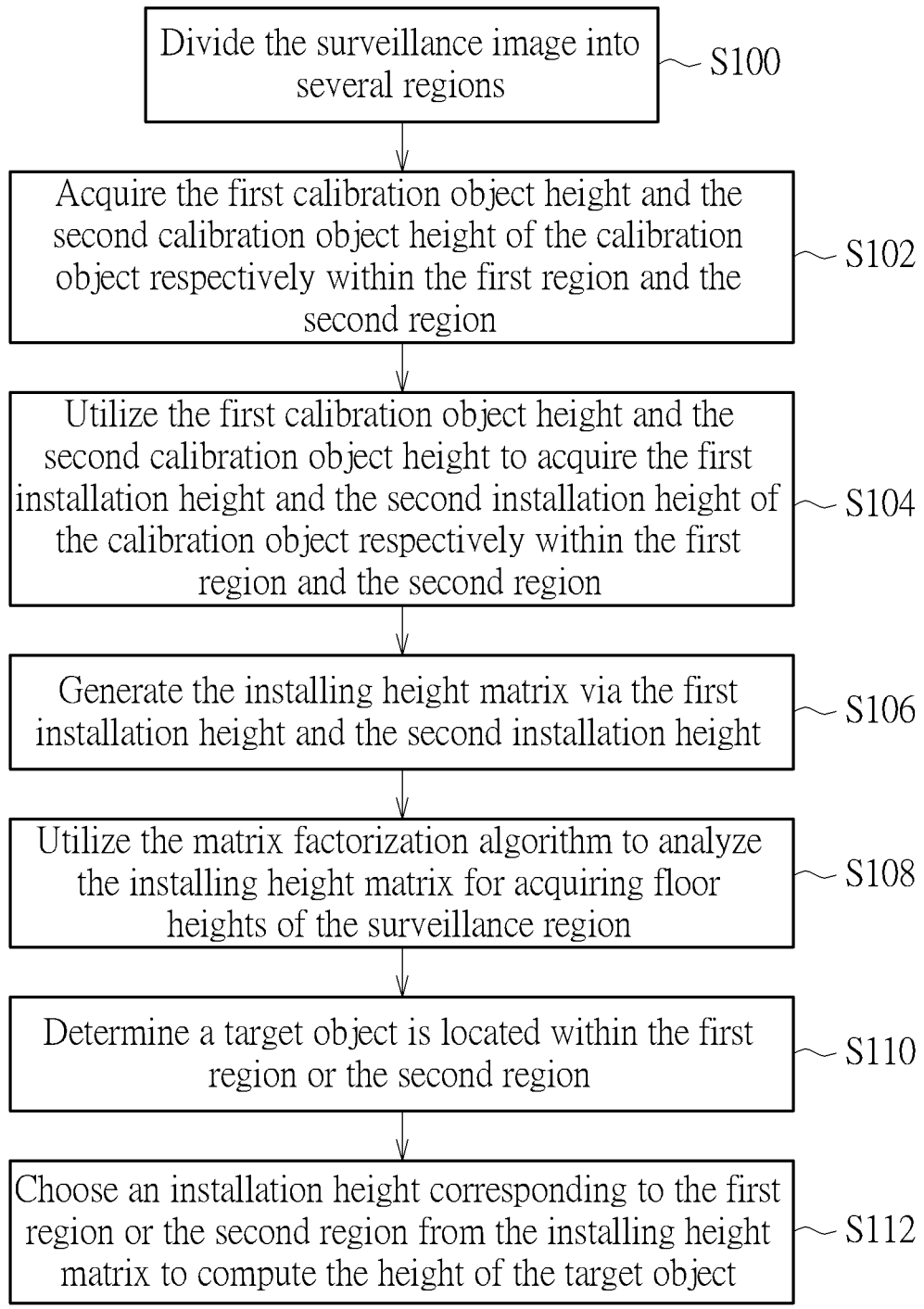
FIG. 3 is a flow chart of a floor height detection method according to the embodiment of the present invention.
Figure 4:
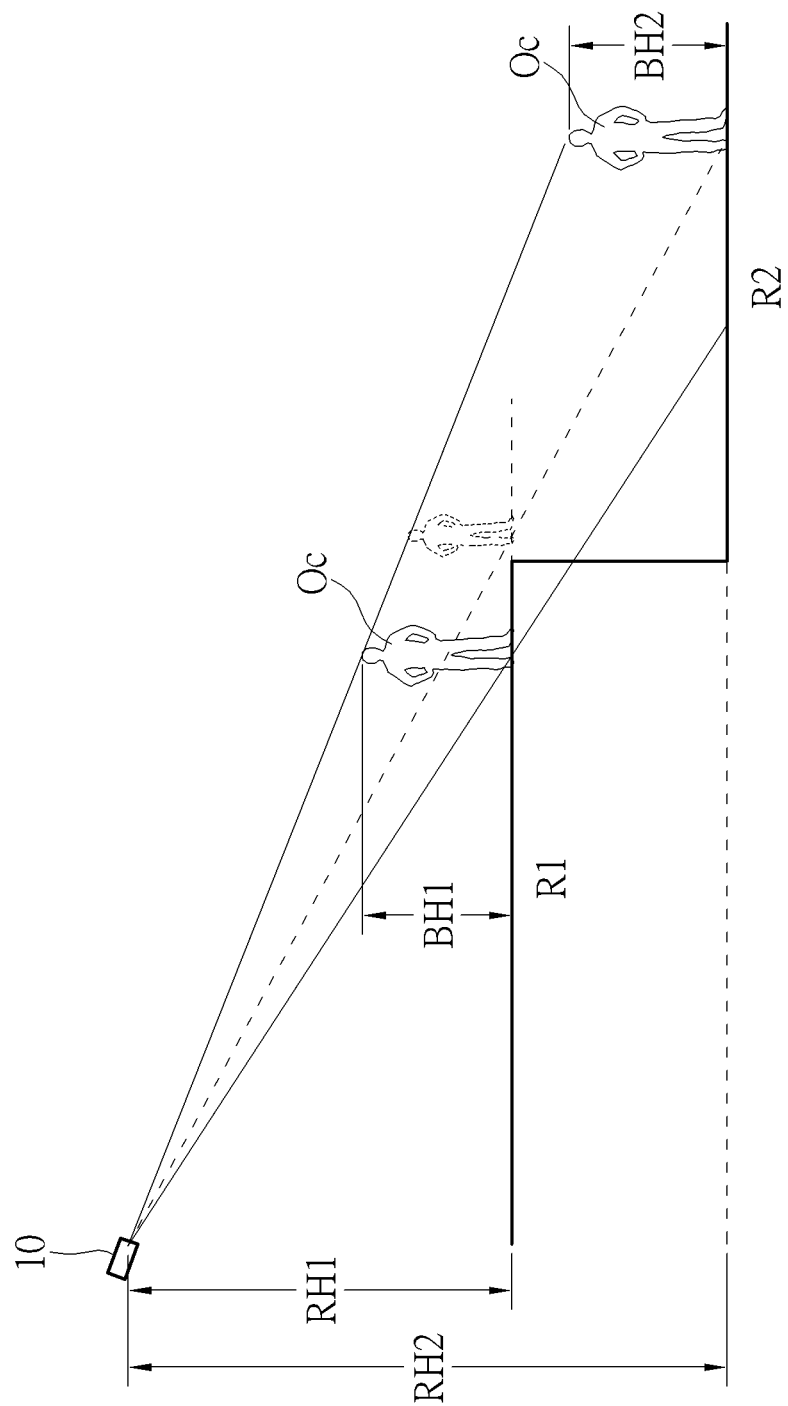
FIG. 4 is a side view of the surveillance camera and several related objects according to the embodiment of the present invention.

The surveillance camera 10 can include an image receiver 12 and an operation processor 14. The image receiver 12 may be disposed on a high position to overlook the surveillance region and acquire a series of surveillance images I containing the surveillance region. The operation processor 14 can analyze the series of surveillance images I, and acquire a moving trace and height variation of a specific object inside the series of surveillance images I. The operation processor 14 can determine an installation height of the surveillance camera 10 relative to a region where the specific object is located inside according to the height variation of the moving specific object, so as to acquire the floor heights of different regions within the surveillance region. Please refer to FIG. 2 to FIG. 4. FIG. 3 is a flow chart of a floor height detection method according to the embodiment of the present invention. FIG. 4 is a side view of the surveillance camera 10 and several related objects according to the embodiment of the present invention. The floor height detection method illustrated in FIG. 3 can be suitable for the surveillance camera 10 shown in FIG. 1.

In the present invention, step S100 can be executed for a start that the floor height detection method can divide the surveillance image I into several regions, and each region can correspond to a specific area of the surveillance region. For example, the surveillance image I can be at least divided into a first region R1 and a second region R2. The first region R1 can correspond to the left side of the surveillance region, and the second region R2 can correspond to the right side of the surveillance region. A number of the regions within the surveillance image I cannot be limited to the above-mentioned embodiments, which depends on a design demand. If the topographic change of the surveillance region is complicated, more than two regions can be divided, such as 3×3 or 5×5 region matrix, and some regions may be combined when a related part of the surveillance region is smooth. If the topographic change of the surveillance region is flat, regions with a fewer number can be set, and some regions may be further divided if another related part of the surveillance region is complicated.

One or plural calibration objects Oc can be moved inside the surveillance region, and the moving trace of the calibration objects Oc may appear within the first region R1 or the second region R2 of the series of surveillance images I. As shown in FIG. 2, the first region R1 can have the platform, and the second region R2 is the ground of the floor without any platform. A height of the first region R1 can be greater than a height of the second region R2. When the surveillance camera 10 is disposed above the first region R1 to face toward the first region R1 and the second region R2, a detected height of the calibration object Oc located inside the first region R1 can be greater than a detected height of the calibration object Oc located inside the second region R2. Then, the floor height detection method can execute step S102 to track and acquire one height (which can be defined as a first calibration object height BH1) of the calibration object Oc within the first region R1 and another height (which can be defined as a second calibration object height BH2) of the calibration object Oc within the second region R2.

The surveillance camera 10 can be a three dimensional camera used to capture the surveillance image I with depth information. In step S102, the floor height detection method may analyze the depth information of the calibration object Oc within the surveillance image I to acquire head information and foot information of the calibration object Oc, and then compute height difference between the head information and the foot information to acquire the calibration object height. The surveillance camera 10 may optionally be other type of cameras, and an acquirement of the calibration object height is not limited to the foresaid embodiment, and depends on the design demand. In addition, if the plurality of calibration objects is captured by the surveillance image I, step S102 can compute all calibration object heights of each calibration object, and then compute a mean height of a plurality of calibration object heights, and the mean height can be represented as the calibration object height of each region. Thus, the first calibration object height BH1 can preferably be the mean height of the plurality of calibration objects Oc stayed in the first region R1, and the second calibration object height BH2 can preferably be the mean height of the plurality of calibration objects Oc stayed in the second region R2.

Then, steps S104, S106 and S106 can be executed that the first calibration object height BH1 and the second calibration object height BH2 can be utilized to acquire a first installation height RH1 of the surveillance camera 10 relative to the first region R1 and a second installation height RH2 of the surveillance camera 10 relative to the second region R2, and generate the installing height matrix via the first installation height RH1 and the second installation height RH2, and then the installing height matrix can be analyzed by a matrix factorization algorithm to acquire the floor heights of the surveillance region. When the floor heights of the surveillance region is acquired, the surveillance camera 10 can execute steps S110 and S112 to determine a target object Ot inside the surveillance image I is located within the first region R1 or the second region R2, and choose an installation height corresponding to the first region R1 or the second region R2 from the installing height matrix for computing a target object height of the target object Ot.

Step S104 may be implemented by two manners. In the first manner, the surveillance camera 10 can have a predefined installation angle and a predefined installation height when being installed. The first calibration object height BH1 and the second calibration object height BH2 acquired by step S102 can be respectively compared with a reference object height, and then the installation height can be computed via foresaid object height difference. The reference object height can be an object height statistics result of an area where inside the surveillance camera 10 is located. For example, the reference object height may be set as 1.75 meter (which is an average height of male Taiwanese) if the surveillance camera 10 is installed in Taiwan, and the reference object height may be set as 1.7 meter (which is an average height of male Japanese) if the surveillance camera 10 is installed in Japan.

When the first calibration object height BH1 (or the second calibration object height BH2) is greater than the reference object height, the first installation height RH1 (or the second installation height RH2) may be smaller than the predefined installation height, and a ratio of the first calibration object height BH1 (or the second installation height RH2) to the reference object height can be used to compute the first installation height RH1 (or the second installation height RH2). For example, if the first calibration object height BH1 is equal to 1.8 meter, and the reference object height is equal to 1.7 meter, and the predefined height of the surveillance camera 10 when be installed is equal to 3.0 meter, so that the installation height of the surveillance camera 10 can be computed as 2.83 meter (=300*170/180). If the first calibration object height BH1 (or the second calibration object height BH2) is smaller than the reference object height, the first installation height RH1 (or the second installation height RH2) may be greater than the predefined installation height, and the first installation height RH1 (or the second installation height RH2) can be computed via the ratio of the first calibration object height BH1 (or the second installation height RH2) to the reference object height.

The second manner is designed for the calibration object Oc having the known actual height. The surveillance camera 10 can track the moving trace of one or some calibration objects Oc having the known actual height within the first region R1 and the second region R2 of the surveillance region; then, the first calibration object height BH1 of the calibration object Oc within the first region R1 (or the second calibration object height BH2 of the calibration object Oc within the second region R2) acquired by step S102 can be compared with the known actual height. If the first calibration object height BH1 (or the second calibration object height BH2) is greater than the known actual height, position of the first region R1 may be higher than position corresponding to the predefined installation height of the surveillance camera 10, and the first installation height RH1 (or the second installation height RH2) can be computed via the ratio of the first calibration object height BH1 (or the second calibration object height BH2) to the known actual height. If the first calibration object height BH1 (or the second calibration object height BH2) is greater than the known actual height, the position of the first region R1 may be lower than position corresponding to the predefined installation height of the surveillance camera 10, and the first installation height RH1 (or the second installation height RH2) can be computed by the ratio of the first calibration object height BH1 (or the second calibration object height BH2) to the known actual height.

The floor height detection method of the present invention can set a database by statistics of the calibration object Oc for determining the floor heights of the surveillance region. The single calibration object Oc may be used to move within the surveillance region back and forth to generate a plurality of calibration object heights, or the plurality of calibration objects Oc may be used to pass through the surveillance region respectively along different directions and different tracks to generate the plurality of calibration object heights. The mean value of the plurality of calibration object heights can be computed to set as the calibration object height in the floor height detection method. As the floor heights of the surveillance region is confirmed, the floor height detection method of the present invention can detect the area where the target object Ot is located inside and then accurately compute the height of the target object Ot.

In step S106, a row number and a column number of the installing height matrix can depend on a number of divided regions within the surveillance image I; for example, the 1×2 installing height matrix can be shown in FIG. 2. In step S108, the present invention can utilize Singular Value Decomposition (SVD) to execute Principal Component Analysis (PCA) on the installing height matrix, or utilize any other suitable matrix factorization algorithm to analyze the installing height matrix. A formula of the SVD can be $AH=USV^T$. If the surveillance image is assumed to divide into 5×5 regions, the installing height matrix AH can be the 5×5 matrix as Table 1; it should be mentioned that the surveillance image transformed into the matrix in Table 1 is not the surveillance image I shown in FIG. 2. The installing height matrix AH can be decomposed by the SVD to acquire S matrix in Table 2, U matrix in Table 3 and $V^T$ matrix in Table 4.

The S matrix can be used to determine whether the installing height matrix AH contains a principal component. If the principal component is discovered by the S matrix, such as a value of 16.58, effects by other components are weak, and the single principal component can restore the matrix to determine whether the installing height matrix AH has a specific trend. If at least two larger components are discovered by the S matrix, a specific threshold can be set, and the component greater than the specific threshold can be defined as the principal component of the S matrix; a number of the principal components can decide how many rows and columns in the U matrix and the $V^T$ matrix are found to determine the floor heights. In Table 2, the value of 16.58 in the S matrix is represented as the principal component, and all values of a first column in the U matrix are similar (such as values of 0.45), which means the surveillance image I does not have severe height change in a vertical direction; however, values of a first row in the $V^T$ matrix are gradually increased (such as values of 0.13, 0.27, 0.4, 0.54 and 0.67), which means the surveillance image I has obvious height change in a horizontal direction, such as the ramp.

TABLE 1

(Installing Height Matrix, AH)

| 1 | 2 | 3 | 4 | 5 |
|---|---|---|---|---|
| 1 | 2 | 3 | 4 | 5 |
| 1 | 2 | 3 | 4 | 5 |
| 1 | 2 | 3 | 4 | 5 |
| 1 | 2 | 3 | 4 | 5 |

TABLE 2

(S matrix)

| 16.58 |
|---|
| 0 |
| 0 |
| 0 |
| 0 |

TABLE 3

(U matrix)

| 0.45 | −0.22 | −0.50 | −0.71 | 0.00 |
|---|---|---|---|---|
| 0.45 | −0.22 | −0.50 | 0.71 | 0.00 |
| 0.45 | 0.89 | 0.00 | 0.00 | 0.00 |
| 0.45 | −0.22 | 0.50 | 0.00 | 0.71 |
| 0.45 | −0.22 | 0.50 | 0.00 | −0.71 |

TABLE 4

($V^T$ matrix)

| 0.13 | 0.27 | 0.40 | 0.54 | 0.67 |
|---|---|---|---|---|
| −0.89 | 0.45 | 0.00 | 0.00 | 0.00 |
| −0.01 | −0.03 | −0.79 | 0.61 | 0.00 |
| 0.41 | 0.82 | −0.27 | −0.31 | 0.00 |
| −0.12 | −0.25 | −0.37 | −0.49 | 0.74 |

In the present invention, if the calibration object height of the calibration object Oc moved from the first region R1 to the second region R2 are decreased or increased gradually, the ramp may be located between the first region R1 and the second region R2, such as the matrixes in Table 1-4, and a slope of the ramp can be decided by a gradually decreased or increased trend of the calibration object height. If the calibration object height of the calibration object Oc moved from the first region R1 to the second region R2 has sudden change, a break or a stair may be formed between the first region R1 and the second region R2, such as the matrixes in Table 5-8. The surveillance image can be divided into 6×6 regions to acquire the installing height matrix AH. The installing height matrix AH in Table 5 can be decomposed by the SVD to acquire the S matrix in Table 6, the U matrix in Table 7 and the $V^T$ matrix in Table 8. The S matrix can be used to decide the principal component of the installing height matrix AH. The principal component can be found by the S matrix, such as a value of 147.31, the effects by other components are weak, and the single principal component can restore the matrix; then, the principal component of the S matrix can be used to find out some rows and some columns in the U matrix and the $V^T$ matrix to determine the floor heights. In Table 7, a first value and a second value of the first column of the U matrix are close (such as values of 0.19), and a third value and a fourth value of the first column of the U matrix are close (such as values of 0.37 and 0.39), and a fifth value and a sixth value of the first column of the U matrix are close (such as values of 0.56 and 0.57), so that the surveillance image I may have three breaks or three stairs along the vertical direction. In Table 8, values of each row of the $V^T$ matrix are similar, or are increased and then decreased gradually, so that the surveillance image I can have the floor heights with corresponding slope along the horizontal direction. If the slope of the ramp exceeds a view angle of the surveillance camera 10, which means the surveillance camera 10 cannot catch the full body image of the calibration object Oc, the floor height detection method of the present invention can further analyze variation of a body ratio of the calibration object Oc to compute the slope of the ramp.

TABLE 5

(Installing Height Matrix, AH)

| 10 | 11 | 12 | 11 | 12 | 11 |
|----|----|----|----|----|----|
| 11 | 12 | 11 | 12 | 10 | 12 |
| 22 | 23 | 23 | 22 | 23 | 22 |
| 23 | 24 | 22 | 23 | 24 | 24 |
| 34 | 33 | 33 | 34 | 33 | 34 |
| 35 | 33 | 35 | 34 | 35 | 35 |

TABLE 6

(S matrix)

147.31
2.61
2.15
1.58
0.85
0.45

TABLE 7

(U matrix)

| 0.19 | −0.49 | 0.35 | −0.37 | 0.61 | 0.32 |
|------|-------|------|-------|------|------|
| 0.19 | 0.61 | 0.12 | −0.58 | 0.24 | −0.43 |
| 0.37 | −0.29 | 0.44 | −0.28 | −0.70 | −0.13 |
| 0.39 | 0.25 | 0.55 | 0.66 | 0.21 | −0.09 |
| 0.56 | 0.34 | −0.30 | −0.08 | −0.12 | 0.68 |
| 0.57 | −0.36 | −0.52 | 0.12 | 0.16 | −0.48 |

TABLE 8

($V^T$ matrix)

| 0.41 | 0.40 | 0.41 | 0.41 | 0.41 | 0.41 |
|------|------|------|------|------|------|
| 0.16 | 0.34 | −0.55 | 0.34 | −0.59 | 0.30 |
| −0.59 | 0.72 | −0.18 | −0.12 | 0.28 | −0.11 |
| 0.36 | −0.11 | −0.66 | −0.32 | 0.54 | 0.17 |
| −0.58 | −0.40 | −0.06 | 0.23 | 0.14 | 0.66 |
| −0.07 | −0.18 | −0.26 | 0.74 | 0.29 | −0.51 |

In addition, if one or some calibration objects Oc are wandered within any region (such as the first region R1) of the surveillance image I, the plurality of first calibration object heights BH1 can be acquired. The present invention can further analyze whether first variation of the plurality of first calibration object heights BH1 has severe change, for determining whether the first region R1 is a smooth surface. For example, the floor height detection method can compare the first variation with a predefined threshold. If the first variation is smaller than or equal to the predefined threshold, the calibration object Oc moved within the first region R1 does not have exaggerated height change, and the calibration objects Oc can be represented as locating on the same plane, which means the first region R1 belongs to the smooth surface. If the first variation is greater than the predefined threshold, the height change of the calibration object Oc within the first region R1 exceeds difference between a high standard height and a low standard height of the indigenous human race, and the first region R1 has obvious height change.

It should be mentioned that the first calibration object height BH1 and the first installation height RH1 may be replaced by each other. The floor height detection method of the present invention can analyze change of the plurality of first installation heights RH1 within the first region R1 (or the change of the plurality of second installation heights RH2 within the second region R2), so as to determine the first region R1 (or the second region R2) belongs to the smooth surface or has the obvious height change.

Therefore, if the first variation is greater than the predefined threshold, the floor height detection method of the present invention can divide the first region R1 into several sub-regions, such as a first sub-region R11 and a second sub-region R12 shown in FIG. 2, and steps S102~S112 can be executed to acquire another installing height matrix relevant to the first sub-region R11 and the second sub-region R12, so as to acquire the floor heights of the first region R1. For example, the first sub-region R11 can correspond to the ground inside the surveillance region, and the second sub-region R12 can correspond to the platform inside the surveillance region, so that a height of the second sub-region R12 can be greater than a height of the first sub-region R11.

Besides, if the first variation is greater than the predefined threshold, the floor height detection method of the present invention can utilize image analysis technology to detect whether a line-type boundary L existed inside the first region R1, as shown in FIG. 2. The line-type boundary L may be a straight line or a curved line, which depends on an actual demand. The floor height detection method can analyze change of the plurality of first calibration object heights BH1 relative to the line-type boundary L, so as to acquire the floor heights of the first region R1. For example, some first calibration object heights BH1 above the line-type boundary L have a lower mean value, and other first calibration object heights BH1 below the line-type boundary L have a larger mean value, so that the height of the sub-region below the line-type boundary L can be greater than the height of the sub-region above the line-type boundary L.

Moreover, if the first variation is greater than the predefined threshold, the floor height detection method of the present invention can utilize the image analysis technology to detect a body size of the calibration object Oc moved within the first region R1 at several points of time. If the full body image of the calibration object Oc can be shown in the upper sub-region and the lower sub-region of the first region R1, but the half body image of the calibration object Oc is shown in a narrow area between the upper sub-region and the lower sub-region of the first region R1, a middle of the first region R1 may have the break or the stair, and the floor heights of the first region R1 can be acquired accordingly. If the continued moving trace of the calibration object Oc has one or some breakpoints, position of the breakpoints may represent the break or the stair of the surveillance region.

The floor height detection method of the present invention can further track and acquire the plurality of second calibration object heights BH2 of the calibration object Oc wandered within another region (such as the second region R2) of the surveillance image I. If the first variation of the plurality of first calibration object heights BH1 and second variation of the plurality of second calibration object heights BH2 are both smaller than the predefined threshold, the first region R1 and the second region R2 can be defined as the smooth surface; in the meantime, the floor height detection method can further analyze whether a mean value of the plurality of first calibration object heights BH1 is the same as or similar to a mean value of the plurality of second calibration object heights BH2. When the mean value of the plurality of first calibration object heights BH1 is different from the mean value of the plurality of second calibration object heights BH2, the first region R1 and the second region R2 may respectively be the smooth surface, but the break or the stair existed between the first region R1 and the second region R2, and therefore the floor height detection method can determine whether to divide the first region R1 and/or the second region R2 in accordance with foresaid description. When the mean value of the plurality of first calibration object heights BH1 is the same as or similar to the mean value of the plurality of second calibration object heights BH2, the first region R1 and the second region R2 belong to the same smooth surface and can be merged accordingly.

In conclusion, the floor height detection method of the present invention can analyze height change of the calibration object to automatically detect and determine the installation height of the surveillance camera relative to the surveillance region, and then compute the floor heights of the surveillance region in accordance with the installation height changed in different regions of the surveillance region. As if the floor heights of the surveillance region are acquired, the surveillance camera can detect the target object within the surveillance region to execute accurate number and height analysis. The calibration object which is used to decide the floor heights is not limited to the human height as mentioned above, and any of a size of the vehicle, a feature size of the human (such as the face or the head) or a specific marker can be used to detect and decide the floor heights of the surveillance region. Comparing to the prior art, the surveillance camera and the floor height detection method of the present invention can analyze statistics data of the height change of the calibration object to determine the floor heights of the surveillance region, without executing field measurement, and have advantages of inexpensive cost and convenient operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A floor height detection method applied to a surveillance camera, a surveillance image captured by the surveillance camera containing a surveillance region, the floor height detection method comprising:

dividing the surveillance image at least into a first region and a second region;
acquiring an installing height matrix of the surveillance camera upon the first region and the second region; and
utilizing a matrix factorization algorithm to analyze the installing height matrix for acquiring floor heights of the surveillance region, so as to determine whether to divide the first region or the second region in accordance with the floor heights.

2. The floor height detection method of claim 1, wherein acquiring the installing height matrix of the surveillance camera upon the first region and the second region comprises:

utilizing the surveillance camera to track and acquire a first calibration object height of a calibration object inside the surveillance region within the first region and further acquire a second calibration object height of the calibration object inside the surveillance region within the second region;
utilizing the first calibration object height and the second calibration object height to acquire a first installation height of the surveillance camera within the first region and further acquire a second installation height of the surveillance camera within the second region; and
generating the installing height matrix via the first installation height and the second installation height.

3. The floor height detection method of claim 2, wherein the surveillance camera has a predefined installation height, the floor height detection method compares the first calibration object height and the second calibration object height respectively with a reference object height, and computes the first installation height and the second installation height in accordance with a comparison result.

4. The floor height detection method of claim 3, wherein the floor height detection method acquires the reference object height via an object height statistics result of an area where inside the surveillance camera is located, or via an automatic learning algorithm.

5. The floor height detection method of claim 2, wherein the calibration object has a known actual height, the floor height detection method analyzes a difference between the first calibration object height and the known actual height to compute the first installation height, and further analyzes a difference between the second calibration object height and the first calibration object height or a difference between the second calibration object height and the known actual height, so as to compute the second installation height.

6. The floor height detection method of claim 1, wherein at least one calibration object is located inside the surveillance region, the floor height detection method tracks and acquires first variation of a plurality of first calibration object heights of the at least one calibration object within the first region, and compares the first variation with a predefined threshold to determine the floor heights of the first region.

7. The floor height detection method of claim 6, wherein when the first variation is greater than the predefined threshold, the floor height detection method divides the first region at least into a first sub-region and a second sub-region, and acquires another installing height matrix of the surveillance camera upon the first sub-region and the second sub-region, so as to acquire the floor heights of the first region.

8. The floor height detection method of claim 6, wherein when the first variation is greater than the predefined threshold, the floor height detection method detects a line-type boundary of the first region, and analyzes change of the plurality of first calibration object heights relative to the line-type boundary, so as to acquire the floor heights of the first region.

9. The floor height detection method of claim 6, wherein the floor height detection method further tracks and acquires a plurality of second calibration object heights of the at least one calibration object within the second region, and determines the floor heights between the first region and the second region in accordance with analysis of the plurality of second calibration object heights.

10. A surveillance camera, comprising:
an image receiver adapted to receive a surveillance image containing a surveillance region; and
an operation processor electrically connected to the image receiver in a wire manner or in a wireless manner, and adapted to analyze the surveillance image, so as to divide the surveillance image at least into a first region and a second region, acquire an installing height matrix of the surveillance camera upon the first region and the second region, and utilize a matrix factorization algorithm to analyze the installing height matrix for acquiring floor heights of the surveillance region, so as to determine whether to divide the first region or the second region in accordance with the floor heights.

11. The surveillance camera of claim 10, wherein the operation processor is further adapted to utilize the surveillance camera to track and acquire a first calibration object height of a calibration object inside the surveillance region within the first region and further acquire a second calibration object height of the calibration object inside the surveillance region within the second region, utilize the first calibration object height and the second calibration object height to acquire a first installation height of the surveillance camera within the first region and further acquire a second installation height of the surveillance camera within the second region, and generate the installing height matrix via the first installation height and the second installation height.

12. The surveillance camera of claim 11, wherein the surveillance camera has a predefined installation height, the operation processor is further adapted to compare the first calibration object height and the second calibration object height respectively with a reference object height, and compute the first installation height and the second installation height in accordance with a comparison result.

13. The surveillance camera of claim 12, wherein the operation processor is further adapted to acquire the reference object height via an object height statistics result of an area where inside the surveillance camera is located, or via an automatic learning algorithm.

14. The surveillance camera of claim 11, wherein the calibration object has a known actual height, the operation processor is further adapted to analyze a difference between the first calibration object height and the known actual height to compute the first installation height, and further analyze a difference between the second calibration object height and the first calibration object height or a difference between the second calibration object height and the known actual height, so as to compute the second installation height.

15. The surveillance camera of claim 10, wherein at least one calibration object is located inside the surveillance region, the operation processor is further adapted to track and acquire first variation of a plurality of first calibration object heights of the at least one calibration object within the first region, and compare the first variation with a predefined threshold to determine the floor heights of the first region.

16. The surveillance camera of claim 15, wherein when the first variation is greater than the predefined threshold, the operation processor is further adapted to divide the first region at least into a first sub-region and a second sub-region, and acquire another installing height matrix of the surveillance camera upon the first sub-region and the second sub-region, so as to acquire the floor heights of the first region.

17. The surveillance camera of claim 15, wherein when the first variation is greater than the predefined threshold, the operation processor is further adapted to detect a line-type boundary of the first region, and analyzes change of the plurality of first calibration object heights relative to the line-type boundary, so as to acquire the floor heights of the first region.

18. The surveillance camera of claim 15, wherein the operation processor is further adapted to track and acquire a plurality of second calibration object heights of the at least one calibration object within the second region, and determine the floor heights between the first region and the second region in accordance with analysis of the plurality of second calibration object heights.

* * * * *